(12) United States Patent
Jando

(10) Patent No.: US 10,837,837 B2
(45) Date of Patent: Nov. 17, 2020

(54) MICROBOLOMETER FOCAL PLANE ARRAY WITH INTEGRATED MULTI-SPECTRAL MOSAIC BAND-PASS FILTER/FOCUSING LENS ARRAY FOR SIMULTANEOUS REAL-TIME ANESTHETIC AND RESPIRATORY GAS CONCENTRATION DETECTION AND MEASUREMENT SIGNAL PROCESSING

(71) Applicant: KONINKLIJKE PHILIPS N.V., Eindhoven (NL)

(72) Inventor: Szilveszter Cseh Jando, Naugatuck, CT (US)

(73) Assignee: Koninklijke Philips N.V., Eindhoven (NL)

( * ) Notice: Subject to any disclaimer, the term of this patent is extended or adjusted under 35 U.S.C. 154(b) by 14 days.

(21) Appl. No.: 16/468,298

(22) PCT Filed: Dec. 8, 2017

(86) PCT No.: PCT/EP2017/082056
§ 371 (c)(1),
(2) Date: Jun. 11, 2019

(87) PCT Pub. No.: WO2018/108743
PCT Pub. Date: Jun. 21, 2018

(65) Prior Publication Data
US 2020/0072675 A1 Mar. 5, 2020

Related U.S. Application Data

(60) Provisional application No. 62/433,507, filed on Dec. 13, 2016.

(51) Int. Cl.
*G01J 5/20* (2006.01)
*G01J 5/08* (2006.01)
*G01N 21/3504* (2014.01)

(52) U.S. Cl.
CPC .......... *G01J 5/0806* (2013.01); *G01J 5/0862* (2013.01); *G01J 5/20* (2013.01); *G01N 21/3504* (2013.01); *G01J 2005/202* (2013.01)

(58) Field of Classification Search
CPC .......... G01J 5/0806; G01J 5/0862; G01J 5/20; G01J 2005/202; G01J 1/0411; G01J 5/06;
(Continued)

(56) References Cited

U.S. PATENT DOCUMENTS 6,277,081 B1 8/2001 Susi et al.
2006/0009707 A1 1/2006 Daniels et al.
(Continued)

OTHER PUBLICATIONS

Sjunnebo "Hyperspectral imaging for gas detection", Royal Institute of Technology, SE-106 91 Stockholm, Sweden 2015, p. 1-49 (Year: 2015).*
International Search Report—PCT/EP2017/082056 filed Dec. 8, 2017.

*Primary Examiner* — David P Porta
*Assistant Examiner* — Mamadou Faye
(74) *Attorney, Agent, or Firm* — Daniel H. Brean

(57) ABSTRACT

A gas monitoring apparatus (10) identifies a target anesthetic or respiratory gas species and determines a concentration thereof. The gas monitor includes a multi-spectral mosaic filter and lens array (12), a composite thermal sensing focal plane array (26), and a signal processor (32). The mosaic filter and lens array (12) comprises a 2D array of lens structures (14) and long wave infrared (IR) band-pass filter elements (16) having a patterned thermally reflective metal disposition layer (18, 22) disposed on a first and/or second surface (20, 24) between adjacent lens structures and/or filter elements, respectively. The composite focal plane array (26) includes a plurality of individual thermal sensing focal plane arrays (28) with integrated read out integrated circuits (ROIC) that output a respective sensed channel data (36). The signal processor (32) receives the sensed channel data
(Continued)

outputs (36) and generates an output indicative of the identification (50) and/or concentration (52) of the target gas based on an oversampling of an absorption signal, on a frame by frame basis and/or an image stacking basis.

20 Claims, 11 Drawing Sheets

(58) Field of Classification Search
CPC ...... G01J 3/0208; G01J 3/0229; G01J 3/0262; G01J 2003/1213; G01J 2021/3531; G01J 3/42; G01J 3/0256; G01J 3/2803; G01N 21/3504

See application file for complete search history.

(56) References Cited

U.S. PATENT DOCUMENTS

| | | | |
|---|---|---|---|
| 2011/0266443 A1* | 11/2011 | Schimert | G01J 1/0411 250/338.4 |
| 2012/0321212 A1 | 12/2012 | Hoegasten et al. | |
| 2015/0136982 A1* | 5/2015 | Kester | G01J 3/36 250/332 |
| 2015/0276478 A1* | 10/2015 | Geelen | G01J 3/0256 356/454 |
| 2015/0316473 A1 | 11/2015 | Kester et al. | |
| 2016/0097713 A1 | 4/2016 | Kester et al. | |
| 2016/0156880 A1* | 6/2016 | Teich | H04N 5/225 348/82 |
| 2016/0198102 A1 | 7/2016 | Chahine et al. | |

\* cited by examiner

82 — Focusing and spectrally filtering a received broadband infrared (IR) energy beam into a plurality of focused and spectrally filtered IR beams, via a multi-spectral mosaic filter and lens array that comprises a 2D array of lens structures and long wave infrared (IR) band-pass filter elements that includes a patterned thermally reflective metal layer overlying at least one of (i) a first surface at least between adjacent lens structures and (ii) a second surface at least between adjacent filter elements

84 — Sensing each of the plurality of focused and spectrally filtered IR beams, via a composite thermal sensing focal plane array that comprises a plurality of individual thermal sensing focal plane arrays with integrated read out integrated circuits (ROIC)s, wherein at least one individual thermal sensing focal plane array is provided for each respective paired lens structure and filter elements of the mosaic filter and lens array, wherein each of the plurality of focused and spectrally filtered IR beams is received by a respective individual thermal sensing focal plane array, and outputting, via each respective ROIC of a corresponding individual thermal sensing focal plane array, a respective sensed channel data responsive to receiving the respective focused and spectrally filtered IR beams

86 — Generating an output signal, via a signal processor operatively coupled to receive the sensed channel data outputs of each respective ROIC of a corresponding individual thermal sensing focal plane array, wherein the output signal is indicative of at least one of an identification and a concentration of a target gas selected from one or more anesthetic and respiratory gas species, based on an oversampling of an absorption signal on one or more of (i) a frame by frame basis and (ii) an image stacking basis of the sensed channel data outputs

FIG. 13

MICROBOLOMETER FOCAL PLANE ARRAY WITH INTEGRATED MULTI-SPECTRAL MOSAIC BAND-PASS FILTER/FOCUSING LENS ARRAY FOR SIMULTANEOUS REAL-TIME ANESTHETIC AND RESPIRATORY GAS CONCENTRATION DETECTION AND MEASUREMENT SIGNAL PROCESSING

CROSS-REFERENCE TO PRIOR APPLICATIONS

This application claims the priority benefit under 35 U.S.C. § 371 of International Patent Application No. PCT/EP2017/082056, filed on Dec. 8, 2017, which claims the priority benefit of U.S. Provisional Patent Application No. 62/433,507, filed on Dec. 13, 2016, the contents of which are herein incorporated by reference.

The present embodiments relate generally to anesthetic and respiratory gas monitoring, and more particularly to, an anesthetic and respiratory gas monitoring apparatus and method for real-time simultaneously identification and concentration determination of a target anesthetic or respiratory gas species.

In one prior known method for identifying a target gas, the method makes use of a multi-surfaced mirror to create several infrared (IR) beams traveling in different directions, each IR beam traveling to a band-pass filter with one thermal detector. N number of gases can be analyzed in parallel and in real-time, but using only one detector per data channel. However the known method suffers from low signal resolution, low signal-to-noise ratio measurement values, and also problems with IR beam loss of signal. The IR beam loss of signal is due to the splitting of the total incoming IR beam energy by an N-sided mirror seen at the detectors. The more sides to the mirror the less signal at the detectors. In addition, monitoring up to four or six gases may be the limitation of such beam splitting technology using a multi-sided mirror.

Accordingly, an improved method and apparatus for overcoming the problems in the art is desired.

According to one embodiment, an anesthetic and respiratory gas monitoring apparatus is adapted to (i) identify a target anesthetic or respiratory gas species and (ii) determine a concentration of the identified target anesthetic or respiratory gas species. The apparatus comprises a multi-spectral mosaic filter and lens array, a composite thermal sensing focal plane array that comprises a plurality of individual thermal sensing focal plane arrays with integrated read out integrated circuits, and a signal processor.

The multi-spectral mosaic filter and lens array comprises a two-dimensional array of lens structures and long wave infrared (IR) band-pass filter elements configured to receive a broadband infrared (IR) energy beam and to focus and spectrally filter the received broadband IR energy beam into a plurality of cones of focused and spectrally filtered IR beams. The mosaic filter and lens array further includes at least one of (i) a patterned thermally reflective metal disposition layer disposed on or overlying a first surface at least between adjacent lens structures and (ii) a patterned thermally reflective metal disposition layer disposed on or overlying a second surface at least between adjacent filter elements.

The composite thermal sensing focal plane array comprises a plurality of individual thermal sensing focal plane arrays with integrated read out integrated circuits. At least one individual thermal sensing focal plane array is provided for each respective one of the paired lens structure and filter elements of the mosaic filter and lens array. Each of the plurality of cones of focused and spectrally filtered IR beams is received by a respective individual thermal sensing focal plane array and, responsive to receiving the focused and spectrally filtered IR beams, each respective integrated read out integrated circuit (ROIC) of a corresponding individual thermal sensing focal plane array outputs a respective sensed channel data.

The signal processor is operatively coupled to receive the sensed channel data outputs of each respective integrated read out integrated circuit (ROIC) of a corresponding individual thermal sensing focal plane array. The signal processor is also adapted to generate an output signal indicative of at least one of an identification and a concentration of a target gas selected from the group consisting of one or more anesthetic and respiratory gas species, based on an oversampling of an absorption signal on at least one or more of (i) a frame by frame basis and (ii) an image stacking basis of the sensed channel data outputs.

According to another embodiment, the patterned thermally reflective metal layer comprises at least one of gold, platinum, titanium, palladium, nickel, aluminum, or any combination thereof. The patterned thermally reflective metal layer is configured to (i) create a frame (i.e., cross-talk minimization structure) of windows as apertures to minimize cross-talk between adjacent channels of a respective thermal sensing focal plane array of the composite thermal sensing focal plane array and paired lens structure and filter elements of the mosaic filter and lens array. The patterned thermally reflective metal layer is further configured to (ii) create respective thermal dark zones between the adjacent channels. In another embodiment, the thermal dark zones between adjacent channels form dark pixels on a respective thermal sensing focal plane array of the composite thermal sensing focal plane array for use in a baseline subtraction of a dark signal from a light signal in connection with an improved signal-to-noise performance.

In a further embodiment, the apparatus comprises wherein the long wave IR band-pass filters are configured for passing long wave infrared wavelengths extending into mid-wave infrared wavelengths that comprise wavelengths from 2 µm to 15 µm. In another embodiment, the apparatus comprises wherein each IR filter element of the mosaic filter and lens array includes a different narrow band-pass filter with a center wavelength ($\lambda_c$) unique to a corresponding at least one or more target anesthetic or respiratory gas species to be monitored. In yet another embodiment, the apparatus comprises wherein two or more IR filter elements, each having a different center wavelength ($\lambda_c$), of the mosaic filter and lens array are used for an additive measurement in monitoring each of at least one or more target anesthetic or respiratory gas species.

According to another embodiment, the apparatus further comprises wherein each individual array of the composite thermal sensing focal plane array is configured with a gain, bias voltage, and frame rate that are unique to a respective individual thermal sensing focal plane array. In addition, a sensor material of each of at least two individual thermal sensing focal plane arrays of the composite thermal sensing focal plane array is different from each other. Still further, the sensor material comprises one selected from the group consisting of vanadium oxide (VO) and amorphous silicon (a-Si).

In a still further embodiment, the apparatus comprises wherein the individual thermal sensing focal plane arrays with integrated read out integrated circuits include two-dimensional arrays selected from the group consisting of microbolometers, thermopiles, and pyroelectric, thermister, or biomaterial microcantilever thermal sensors. In addition, the one or more anesthetic and respiratory gas species comprise species selected from the group consisting of carbon dioxide, nitrous oxide, enflurane, halothane, isoflurane, desflurane, and sevoflurane. In a further embodiment, the center wavelengths and wavelength bandwidths for each of the IR filter elements are selected for uniquely identifying each of a plurality of different gas species in a gas mixture to be (i) supplied to, (ii) received from, or (iii) supplied to and received from a subject. In addition, a combination of different gas species, center wavelengths, and wavelength bandwidths, respectively, comprise two or more selected from the group consisting of (i) carbon dioxide, 14.925 µm and 670 cm$^{-1}$, (ii) nitrous oxide, 16.949 µm and 590 cm$^{-1}$, (iii) enflurane, 7.326 µm and 1365 cm$^{-1}$, (iv) halothane, 12.500 µm and 800 cm$^{-1}$, (v) isoflurane, 8.25 µm and 1212 cm$^{-1}$, (vi) desflurane, 8.456 µm and 1182.5 cm$^{-1}$, and (vii) sevoflurane, 9.615 µm and 1040 cm$^{-1}$.

According to yet another embodiment, the apparatus comprises wherein generating the at least one of identification and concentration of the target gas based on the oversampling of the absorption signal on the at least one or more of (I) a frame by frame basis and (II) an image staking basis of the sensed channel data outputs for a respective thermal sensing focal plane array includes: (i) creating a first pixel map, in an absence of any applied thermal source energy corresponding to a dark frame, of a pixel array of the respective thermal sensing focal plane array, and determining bad pixels that exhibit too high a value to provide any useful dynamic range, (ii) creating a second pixel map of the pixel array in a presence of an applied thermal source energy, and determining non-responsive pixels that exhibit too low a value to provide any useful dynamic range, (iii) determining, with no presence of absorbing gas in a spectral optical path of the respective thermal sensing focal plane array, a differential baseline of the pixel array by an applying thermal source energy and subtracting dark pixel data and excluding the determined bad pixels, wherein the differential baseline provides for an offset correction per each active useful pixel of the pixel array, (iv) calculating a volume integral, with a presence of absorbing gas in the spectral path, by adding up pixel values associated with a spot area of decreasing thermal energy appearing on the pixel array in response to the presence of the absorbing gas in the spectral path, and (v) subtracting a calculated volume integral of a same spot area for the dark frame from the calculated volume integral in the presence of the absorbing gas in the spectral path, to yield a value of a differential signal proportional to gas concentration, corrected for offset errors and bad pixels.

Advantages and benefits will become apparent to those of ordinary skill in the art upon reading and understanding the following detailed description.

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

FIG. 11 is a representative view of sensed channel data of the individual thermal sensing focal plane array for a target gas species and a boundary of an absorption peak, according to an embodiment of the present disclosure;

Figure 11:
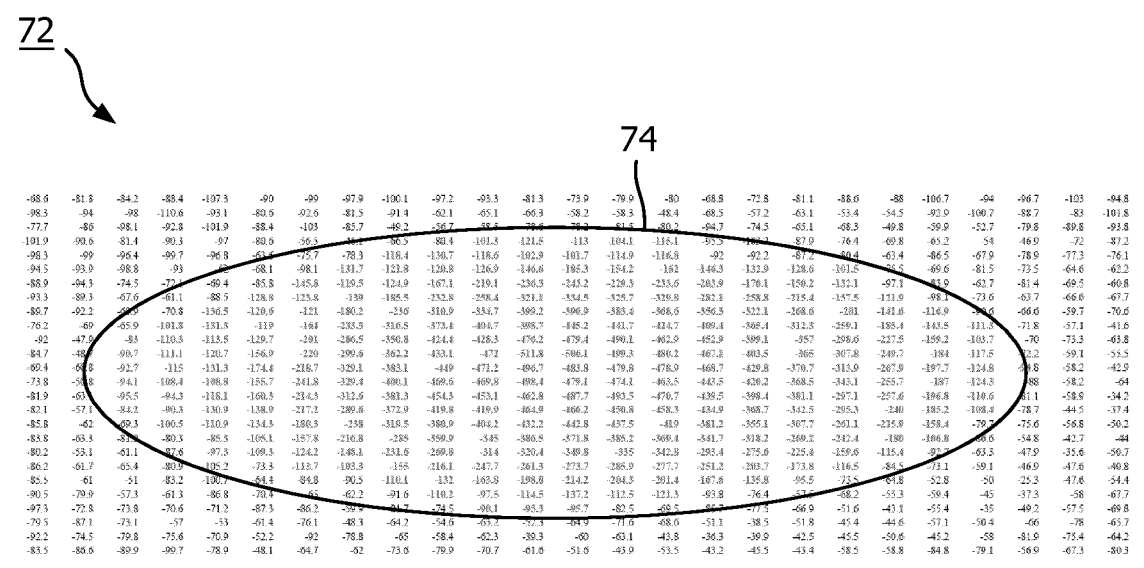
Figure 12:
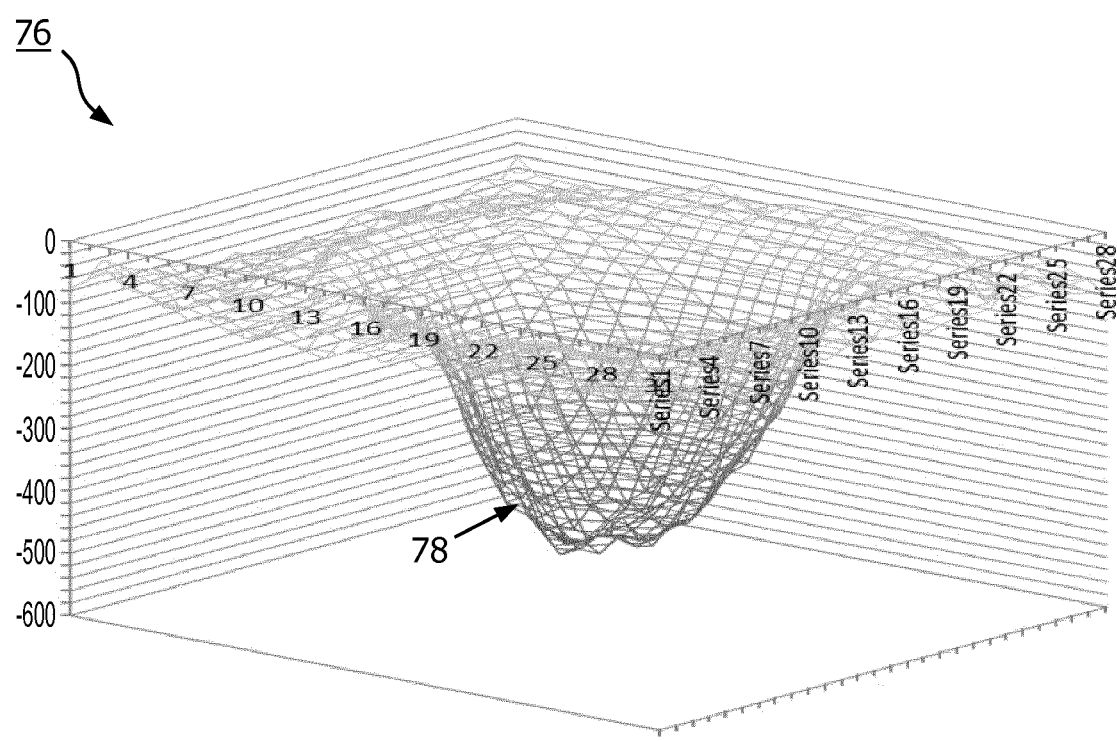

FIG. 12 is a graphical plot view of the sensed channel data of the individual thermal sensing focal plane array for the target gas species within the absorption peak boundary of FIG. 11; and FIG. 13 is a flow diagram view of a method for monitoring an anesthetic and respiratory gas according to an embodiment of the present disclosure that is adapted to (i) identify a target anesthetic or respiratory gas species and (ii) determine a concentration of the identified target anesthetic or respiratory gas species.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

In addition, unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

In connection with various embodiments of the present disclosure, low cost microbolometers today have pixel counts starting at 80 by 60 for a total of 4800 pixels. Each pixel element is a temperature sensitive resistive material made from vanadium oxide or amorphous silicon. Microbolometers, once exclusively used in military applications have now been established in the commercial arena and have thus greatly been reduced in cost. Like in the visible CMOS image sensor market, it is forecasted that pixel count and sensitivity for microbolometers will keep increasing as volume production increases with cost per unit decreasing. With increasing pixel counts and improving sensitivities, more signal processing opportunities become evident. As will be understood herein, by having an N×N multi-spectral mosaic filter and lens array and with an X×Y number of pixels of a corresponding microbolometer associated with each filter and lens array element, an over-sampling of the data can advantageously be performed.

Unlike in prior art, in which one thermal detector or pixel element is used per gas species detection, the embodiments of the present disclosure advantageously make use of an array of microbolometer pixel detectors, i.e., two or more orders of magnitude of detectors, thus greatly increasing detectability, statistically improving measurement resolution, and a signal-to-noise ratio of the anesthetic respiratory gas concentration measurements. As an example, the 80 by 60 pixel microbolometer with 4800 pixel elements using a 3×3 multi-spectral mosaic filter and lens array matrix would have 533 pixels per filter element and thus provide 533 parallel data channels of information. Similarly, with an 80 by 80 pixel microbolometer, there would be 711 pixels per filter element, and thus provide 711 parallel data channels of sensed long wave infrared information. As long as sensitivity stays the same, the increasing of pixel count per filter element, and thus the increasing of the over-sampling and the number of data channels in parallel, advantageously allows for improving a signal-to-noise and gas detection/concentration measurement performance of the gas monitoring apparatus according to the embodiments of the present disclosure. Further according to the embodiments of the present disclosure, algorithmic elements for determining gas concentration of a target gas include use of one or more of (i) pixel-by-pixel data from consecutive captured frames and/or frame-by-frame averaging with dark baseline subtraction, (ii) absorption peak area boundary detection to determine a sub-pixel array, and (iii) 3-D volume integral calculations of the detected absorption peak from the sub-pixel array, per captured microbolometer frame data, representing an unknown gas concentration to a known calibration value of gas concentration.

As will be understood herein, the embodiments of the present disclosure advantageously use tens to hundreds or thousands of detectors per data channel, given that each pixel of a microbolometer array comprises a detector. The embodiments further utilize an over-sampling per each data channel. With over-sampling, a finer measurement per data channel can be made, advantageously resulting in a higher signal-to-noise ratio and improved resolution through statistical and/or signal processing algorithms.

Figure 1:
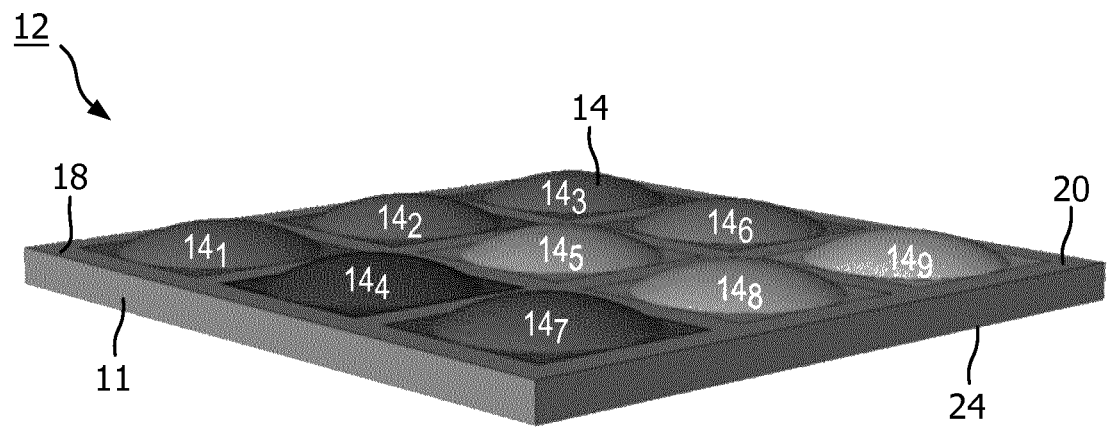
FIG. 1 is a perspective view of a multi-spectral mosaic filter and lens array of the gas monitoring apparatus according to an embodiment of the present disclosure that comprises a two-dimensional array of lens structures and long wave infrared (IR) band-pass filter elements with a reflective metal deposition overlying a first surface thereof.

With reference now to FIG. 1, a perspective view is shown of a multi-spectral mosaic filter and lens array 12 of a gas monitoring apparatus 10 (FIG. 5) adapted to (i) identify a target anesthetic or respiratory gas species and (ii) determine a concentration of the identified target anesthetic or respiratory gas species, according to an embodiment of the present disclosure. The mosaic filter and lens array 12 is configured to receive a broadband infrared (IR) energy beam and to focus and spectrally filter the received broadband IR energy beam into a plurality of cones of focused and spectrally filtered IR beams, as will be discussed further herein. With reference still to FIG. 1, the mosaic filter and lens array 12 comprises a lens/filter package substrate 11 that includes a two-dimensional array of lens structures $14_{1-N}$ integral with long wave (LW) infrared (IR) band-pass filter elements $16_{1-N}$ (FIG. 2) and having a reflective metal deposition 18 overlying a first surface 20 of substrate 11 thereof. Note that the multi-spectral mosaic filter and lens array 12 may also be referred to herein as an LWIR filter array mosaic. The lens structures $14_{1-N}$ can comprise, for example, an array of plano-convex lenses, one lens per each filter element $16_{1-N}$ formed within lens/filter package substrate 11, using any suitable multi-chip module and/or optical component module fabrication and/or packaging technique(s) known in the art. In another embodiment, the lens structures may comprise other types of lens structures selected according to the requirements of a given gas monitoring implementation. Note that for explanation purposes only, the value of N, as used in the disclosure herein, is an integer number representing a plurality equal to the number 9. Other values of N are also possible.

In addition, each of the long wave IR band-pass filters $16_{1-N}$ can comprise any suitable filter configured for passing desired long wave infrared wavelengths extending into mid-wave infrared wavelengths. Preferably, the desired wavelengths are within a range of wavelengths from 2 µm to 15 µm. Furthermore, each LWIR filter element $16_{1-N}$ of the mosaic filter and lens array 12 can comprise a different narrow band-pass filter with an appropriately selected center wavelength ($\lambda_c$) unique to one or more of a desired plurality of target anesthetic or respiratory gas species to be monitored. In one embodiment, the band-pass filters comprise suitable filter coating applied on a surface of the mosaic filter and lens array 12. The array of different narrow band-pass filters can include the use of multiple center wavelengths unique to a given target gas species, as will be discussed further herein. In the latter instance, two or more IR filter elements $16_{1-N}$, each having a different center wavelength ($\lambda_c$), can be used for an additive measurement in monitoring each of at least one or more target anesthetic or respiratory gas species.

With reference still to FIG. 1, the reflective metal deposition 18 comprises a patterned thermally reflective metal disposition layer disposed on or overlying the first surface 20 of the lens/filter package substrate 11 at least between adjacent lens structures $14_{1-N}$. Deposition and patterning of the thermally reflective metal deposition 18 can be done using suitable metal deposition and patterning techniques known in the art. The patterned thermally reflective metal layer can comprise at least one of gold, platinum, titanium, palladium, nickel, aluminum, or any combination thereof. In addition, the patterned thermally reflective metal layer 18 is configured to create a window frame or cross-talk minimization structure of windows. The windows are configured to function as apertures that minimize any potential cross-talk between adjacent channels of a respective thermal sensing focal plane array $28_{1-N}$ of the composite thermal sensing focal plane array 26 (FIG. 3) and paired lens structure and filter elements ($14_{1-N}$ and $16_{1-N}$, respectively) of the mosaic filter and lens array 12. The window frame or cross-talk minimization structure of windows of layer 18 is also configured to create respective thermal dark zones between the adjacent channels. The thermal dark zones between adjacent channels form dark pixels on a respective thermal sensing focal plane array of the composite thermal sensing focal plane array for use in a baseline subtraction of a dark signal from a light signal in connection with an improved signal-to-noise performance, as will be discussed further herein below.

Figure 2:
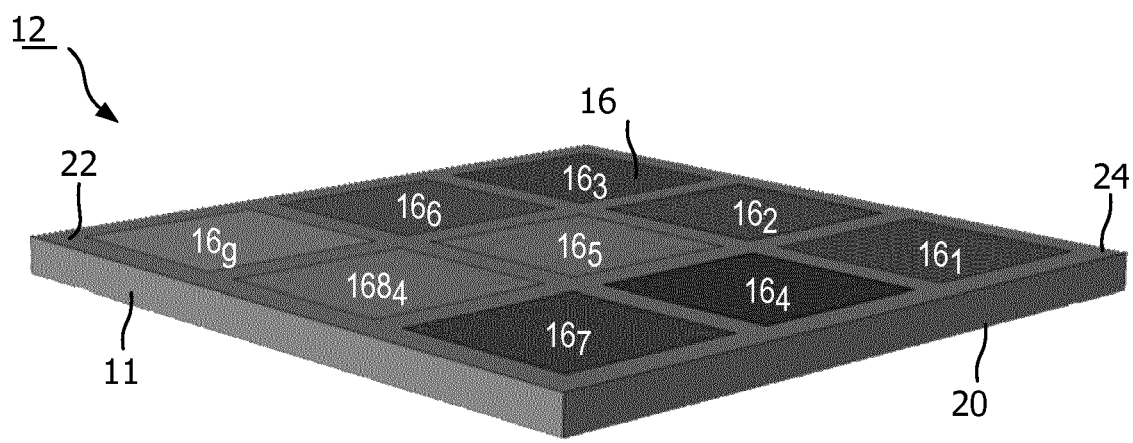
FIG. 2 is a perspective view of the multi-spectral mosaic filter and lens array of FIG. 1 with a reflective metal deposition overlying a second surface thereof, opposite the first surface, according to an embodiment of the present disclosure.

Referring now to FIG. 2, a perspective view of the multi-spectral mosaic filter and lens array 12 of FIG. 1 (turned upside down) is shown with a reflective metal deposition 22 overlying a second surface 24 of the lens/filter package substrate 11 thereof, opposite the first surface 20. In one embodiment, the reflective metal deposition 22 comprises a patterned thermally reflective metal disposition layer disposed on or overlying the second surface 24 at least between adjacent filter elements $16_{1-N}$. The patterned thermally reflective metal layer 22 can comprise at least one of gold, platinum, titanium, palladium, nickel, aluminum, or any combination thereof. Similar to that of the reflective metal deposition 18 of FIG. 1, layer 22 can also be configured to create a window frame or cross-talk minimization structure of windows. In other words, the patterned reflective metal depositions 18 and 22, alone or in combination, each advantageously forms a window frame or cross-talk minimization structure of windows that eliminate and/or significantly reduce an undesirable cross-talk between adjacent optical channels of the lens/filter structures and focal plane sensing arrays.

Figure 3:
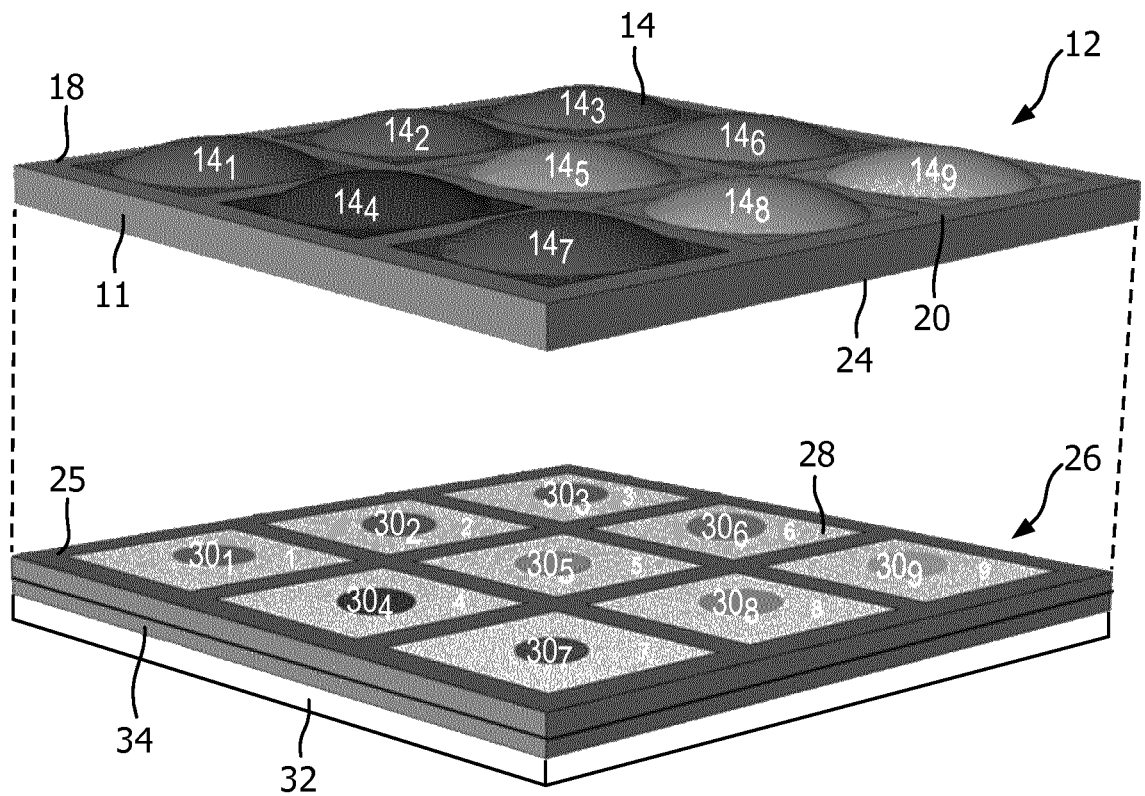
FIG. 3 is an exploded perspective view of a multi-spectral mosaic filter and lens array and composite thermal sensing focal plane array of the gas monitoring apparatus according to an embodiment of the present disclosure.

Turning now to FIG. 3, an exploded perspective view is shown of a multi-spectral mosaic filter and lens array 12 and composite thermal sensing focal plane array (FPA) 26 of the gas monitoring apparatus 10 (FIG. 5) according to an embodiment of the present disclosure. The composite thermal sensing focal plane array 26, formed within multi-chip module packaging substrate 25 using any suitable multi-chip module fabrication and/or packaging technique(s) known in the art, comprises a plurality of individual thermal sensing focal plane arrays $28_{1-N}$, where N equals an integer number, with integrated read out integrated circuits (not shown). In the illustration of FIG. 3, the mosaic filter and lens array 12 comprises nine filter elements in a 3×3 array. Similarly, the composite thermal sensing FPA 26 comprises a respective corresponding nine thermal sensing FPAs in a 3×3 array. In one embodiment, the individual thermal sensing FPAs $28_{1-9}$ with integrated ROICs comprise microbolometers. The nine filter element mosaic filter array with integral plano-convex lenses, one lens per each filter element, is mounted a given distance or spacing above the composite thermal sensing FPA 26 of microbolometers $28_1$ to $28_9$. The distance or spacing between the mosaic filter and lens array 12 of the lens/filter package substrate 11 and the composite thermal sensing FPA 26 of the multi-chip module package substrate 25 is determined according to the particular requirements of a given implementation. In another embodiment, the individual thermal sensing focal plane arrays $28_{1-N}$ with integrated read out integrated circuits comprise two-dimensional arrays selected from the group consisting of microbolometers, thermopiles, and pyroelectric, thermister, or biomaterial microcantilever thermal sensors. It is noted that microbolometers, thermopiles, and pyroelectric, thermister, or biomaterial microcantilever thermal sensors are generally known in the art and thus not discussed further herein.

In one embodiment, one individual thermal sensing focal plane array $28_{1-N}$ is provided in the multi-chip packaging module substrate 25 for each respective one of the paired lens structure and filter elements ($14_{1-N}$ and $16_{1-N}$, respectively) of the mosaic filter and lens array 12 in package substrate 11. In addition, each of a plurality of cones of focused and spectrally filtered IR beams is received by a respective individual thermal sensing focal plane array $28_{1-N}$ (e.g., illustrated via spots $30_{1-N}$ on the respective FPAs $28_{1-N}$). In other words, each lens in the mosaic filter and lens array 12 passes a narrow bandwidth of LWIR energy to the corresponding individual microbolometer FPA sensor element directly beneath it, creating a circular spot of focused LWIR energy. The size of the spot is preferably large enough to utilize as much of the surface area of the microbolometer array sensor element, but not encompass the entire area so that an area outside the focused spot has pixels left in the dark which can be used for baseline subtraction.

Each microbolometer array sensor element can be of any n×n size, for instance a 30×30 pixel sensor with 900 sensor elements, or even a great order such as 80×80 with 6400 pixel sensors. As shown in FIG. 3, the mosaic filter array element $14_7$ focuses a corresponding spot $30_7$ onto the surface of microbolmeter array sensor element $28_7$, and the spot size is less than the total surface area of the sensor array $28_7$. That is, perhaps only 50% is exposed to the infrared energy. The remaining unexposed area of the sensor array $28_7$ is in the dark (i.e., thermally dark), due to the thermally reflective metal deposition 18 on the mosaic filter and lens array 12. Advantageously, these dark pixels can be used for signal processing such as baseline subtraction. Likewise, the adjacent microbolometer array sensor elements numbers $28_4$, $28_5$, and $28_8$ each have their own focused spot of infrared energy ($30_4$, $30_5$, and $30_8$, respectively) with their given wavelengths as determined by the corresponding filter ($16_4$, $16_5$, and $16_8$, respectively) of the mosaic filter and lens array 12. In other words, dark areas exist between all adjacent microbolometer sensor array elements due to the metallization (i.e., thermally reflective metal deposition 18) on the mosaic filter and lens array 12. Responsive to receiving the focused and spectrally filtered IR beams, each respective integrated read out integrated circuit (ROIC) (not shown) of a corresponding individual thermal sensing focal plane array $28_{1-N}$ outputs a respective sensed channel data, as will be discussed herein with reference to FIG. 5.

According to one embodiment, each individual array $28_{1-N}$ of the composite thermal sensing focal plane array 26 can be configured with a gain, bias voltage, and frame rate that are unique to a respective individual thermal sensing focal plane array, according to the requirements of a given gas monitoring application. In addition, a sensor material of each of at least two individual thermal sensing focal plane arrays $28_{1-N}$ of the composite thermal sensing focal plane array 26 can be different from each other. For example, the sensor material may comprise vanadium oxide (VO) or amorphous silicon (a-Si). Other sensor materials may also be possible.

Figure 4:
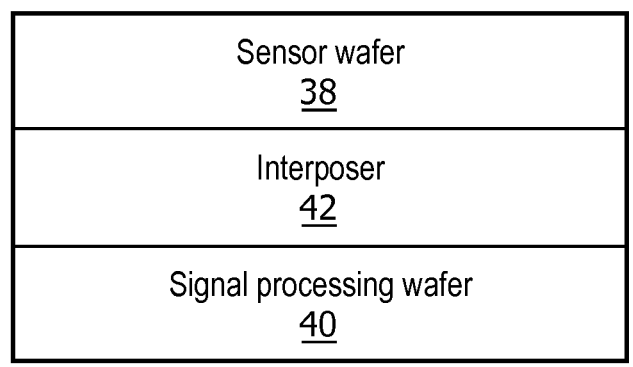
FIG. 4 is a schematic representation view of a sensor wafer bonded to a signal processing wafer through an interposer of the gas monitoring apparatus according to an embodiment of the present disclosure.

With reference still to FIG. 3, the composite thermal sensing focal plane array 26, and thus ROICs of individual thermal sensing focal plane arrays $28_{1-N}$, within the multi-chip module package substrate 25, are physically and operatively coupled to a signal processing unit or signal processor 32 via an interposer 34. Interposer 34 includes signal line vias 36 (see FIG. 5) for operatively coupling signal input and/or outputs for an ROIC of a given thermal sensing focal plane array $16_{1-N}$ of the composite thermal sensing focal plane array 26 with the signal processor 32 (see FIG. 5). FIG. 4 shows a schematic representation view of a sensor wafer or multi-chip module substrate 38, containing a plurality of composite thermal sensing focal plane arrays, bonded to a signal processing wafer or multi-chip module substrate 40, through an interposer wafer/substrate 42. Wafer, substrate and/or multi-chip module bonding techniques are known in the art and thus not discussed further herein.

In one embodiment, each microbolometer array sensor element can be fabricated on a same semiconductor die or on individual semiconductor dies (e.g., silicon die or dies). For example, a complementary metal oxide semiconductor (CMOS) process can be used to create the circuitry for each microbolometer sensor array element 28. In addition, a micro-electromechanical systems (MEMS) fabrication process can be used to create the corresponding composite thermal sensing focal plane array 26. The read out integrated circuit (ROIC) or read out circuitry would be part of each microbolometer sensor array element, which can be on the same semiconductor die or individual dies. To be able to breakout the electrical signals from each microbolometer sensor array element, a second silicon wafer would be bonded to the wafer or substrate containing the microbolometer array elements. This second wafer would serve as an interposer to allow signals to be reached at microbolometer arrays elements that are surrounded by other microbolometer sensor array elements that are on the perimeter, such as sensors $28_1$, $28_2$, $28_3$, $28_4$, $28_6$, $28_7$, $28_8$, and $28_9$ in FIG. 3. In the illustration of FIG. 3, sensor $28_5$ would have no way to connect to external electronics without the use of an interposer layer beneath it. CMOS fabrication processes, e.g., through silicon vias (TSV), silicon interposer (SiIP), and MEMS fabrication processes, e.g., die-to-die, die-to-wafer, and direct bond interconnect (DBI), are generally well known in the art and not discussed further herein.

Figure 5:
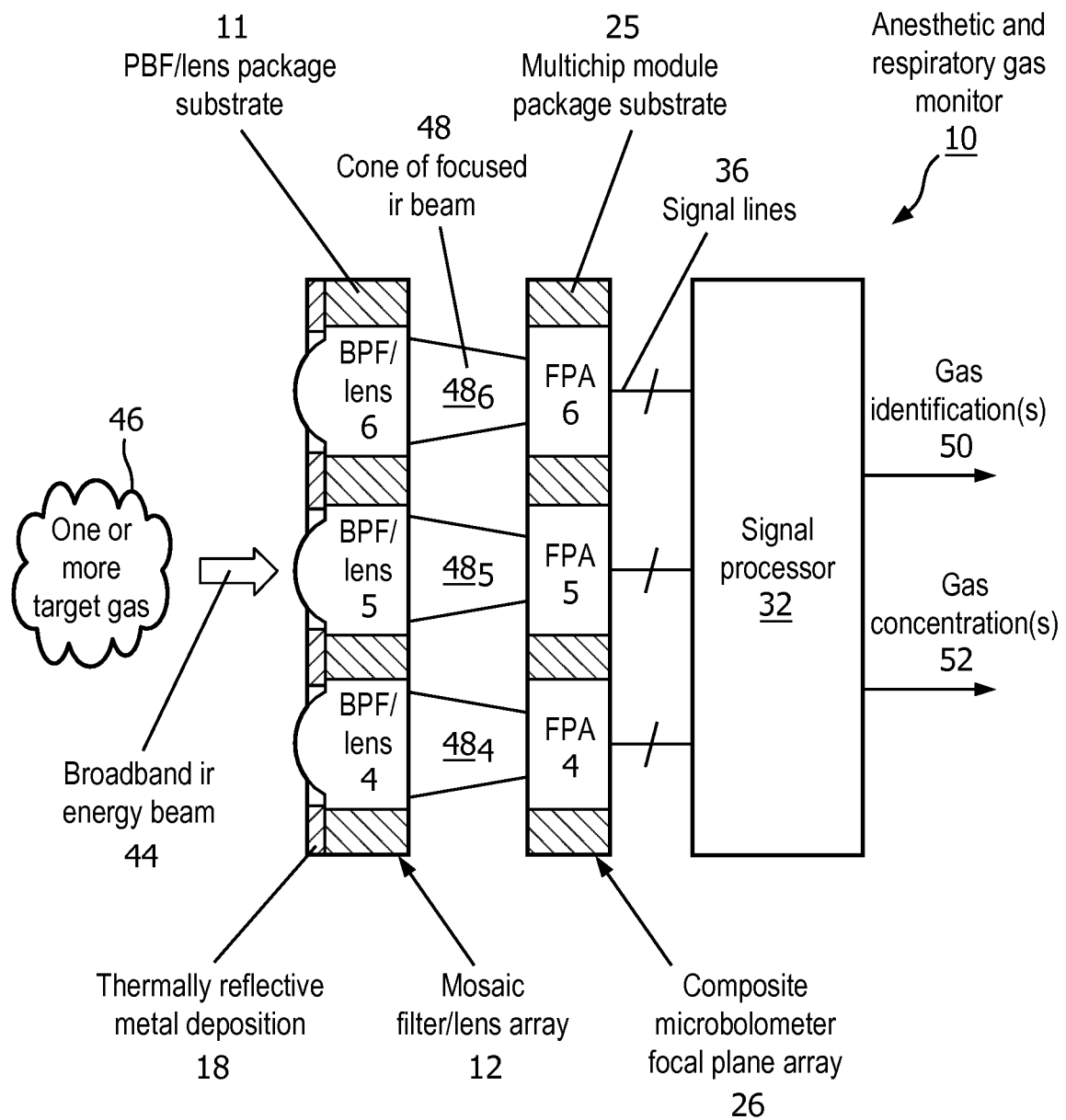
FIG. 5 is a schematic representation view of the gas monitoring apparatus, showing a cross-section of the multi-spectral mosaic filter and lens array and composite thermal sensing focal plane array, according to an embodiment of the present disclosure.

Turning now to FIG. 5, a schematic representation view of the gas monitoring apparatus 10 is shown that includes a cross-section of the multi-spectral mosaic filter and lens array 12 and composite thermal sensing focal plane array 26, according to an embodiment of the present disclosure. In the cross-section of the multi-spectral mosaic filter and lens array 12, the designations BPF/LENS 4, BPF/LENS 5, and BPF/LENS 6 correspond to paired lens structure and filter elements $(14_4,16_4)$, $(14_5,16_5)$, and $(14_6,16_6)$, respectively, of FIG. 3. The paired lens structure and filter elements $(14_4, 16_4)$, $(14_5,16_5)$, and $(14_6,16_6)$, respectively, are disposed with respect to one another within a paired lens structure and filter element package substrate 11. In the embodiment of FIG. 5, a thermally reflective metal deposition 18 is shown overlying a first surface of the mosaic filter/lens array 12. In addition, with reference still to FIG. 5, the cross-section of composite thermal sensing focal plane array 26 of the multi-chip module package substrate 25 includes the designations FPA 4, FPA 5, and FPA 6 which correspond to thermal sensing focal plane arrays $30_4$, $30_5$, and $30_6$, respectively, of FIG. 3. The gas monitoring apparatus 10 of FIG. 5 further includes signal processor 32, as will be discussed further herein below. It should be noted that the discussion herein with reference to FIG. 5 is also applicable to the paired lens structure and filter elements and thermal sensing focal plane arrays not illustrated in FIG. 5, but shown in FIGS. 1-3, as appropriate.

The gas monitoring apparatus 10 of FIG. 5 is adapted to (i) identify a target anesthetic or respiratory gas species and (ii) determine a concentration of the identified target anesthetic or respiratory gas species. The two-dimensional array 12 of paired lens structures $14_{1-N}$ and long wave infrared (IR) band-pass filter elements $16_{1-N}$ are configured to receive a broadband infrared (IR) energy beam 44 emanating from a cloud 46 of one or more target gas, for which an identification and a concentration is to be determined. The paired lens structure and filter elements $(14_4,16_4)$, $(14_5,16_5)$, and $(14_6,16_6)$, respectively, focus and spectrally filter the received broadband IR energy beam 44 into a plurality of cones of focused and spectrally filtered IR beams, collectively indicated via reference numeral 48, further indicated by $48_4$, $48_5$, and $48_6$, respectively. Responsive to receiving the focused and spectrally filtered IR beams, each respective integrated read out integrated circuit (ROIC) of a corresponding individual thermal sensing focal plane array (e.g., FPA 4, FPA 5, and FPA 6) outputs a respective sensed channel data. As indicated previously herein, signal lines 36 (or vias) operatively couple signal input/outputs for each ROIC (not shown) of a given thermal sensing focal plane array (e.g., FPA 4, FPA 5, and FPA 6) of the composite thermal sensing focal plane array 26 with the signal processor 32.

With reference still to FIG. 5, signal processor 32 is operatively coupled to at least receive the sensed channel data outputs of each respective integrated read out integrated circuit (ROIC) of a corresponding individual thermal sensing focal plane array (e.g., FPA 4, FPA 5, and FPA 6). Signal processor 32 is adapted to generate an output signal indicative of at least one of an identification of at least one target gas, e.g., via a gas identification(s) output 50, and a concentration of the at least one target gas, e.g., via a gas concentration(s) output 52. Outputs 50 and 52 can comprise any suitable output for communicating one or more of a signal, data and/or information corresponding to gas identification and/or gas identifications, and gas concentration and/or gas concentrations. For example, the output may be provided to a ventilation system (not shown), or other type of gas detection/monitoring system, configured to use the signal, data and/or information corresponding to gas identification(s) and/or gas concentration(s). The at least one target gas is selected from the group consisting of one or more anesthetic and respiratory gas species. In addition, signal processor 32 is configured to identify the at least one target gas based on an oversampling of an absorption signal on at least one or more of (i) a frame by frame basis and (ii) an image stacking basis of the sensed channel data outputs, as discussed further herein.

According to one or more embodiments, signal processor 32 comprises one or more of a microprocessor, microcontroller, field programmable gate array (FPGA), integrated circuit, discrete analog or digital circuit components, hardware, software, firmware, or any combination thereof, for performing various functions as discussed herein, further according to the requirements of a given gas monitoring device implementation and/or application. Signal processor 32 can further comprise one or more of various modules for executing one or more algorithms and/or for performing various functions, as discussed herein. Additional details regarding the signal processor 32 and related algorithms are provided herein with reference to the Figures.

In one embodiment, signal processor 32 is configured to implement a process of generating at least one of identification and concentration of the target gas based on the oversampling of the absorption signal, on at least one or more of (I) a frame by frame basis and (II) an image staking basis of the sensed channel data outputs for a respective thermal sensing focal plane array. The process of generating includes: (i) creating a first pixel map, in an absence of any applied thermal source energy corresponding to a dark frame, of a pixel array of the respective thermal sensing focal plane array, and determining bad pixels that exhibit too high a value to provide any useful dynamic range, (ii) creating a second pixel map of the pixel array in a presence of an applied thermal source energy, and determining non-responsive pixels that exhibit too low a value to provide any useful dynamic range, (iii) determining, with no presence of absorbing gas in a spectral optical path of the respective thermal sensing focal plane array, a differential baseline of the pixel array by an applying thermal source energy and subtracting dark pixel data and excluding the determined bad pixels, wherein the differential baseline provides for an offset correction per each active useful pixel of the pixel array, (iv) calculating a volume integral, with a presence of absorbing gas in the spectral path, by adding up pixel values associated with a spot area of decreasing thermal energy appearing on the pixel array in response to the presence of the absorbing gas in the spectral path, and (v) subtracting a calculated volume integral of a same spot area for the dark frame from the calculated volume integral in the presence of the absorbing gas in the spectral path, to yield a value of a differential signal proportional to gas concentration, corrected for offset errors and bad pixels, as further discussed herein.

As will be understood from the disclosure herein, the embodiments of the present disclosure advantageously utilize over-sampling of the absorption signal by using many pixels in the individual thermal sensing focal plane array elements to effectively improve the signal-to-noise ratio. Each image frame is to be subtracted from the dark image frame and then the volume integral calculated. This can be done on a frame by frame basis, or on a stack of frames (i.e., image stacking) in which a further averaging of the volume integrals can be calculated. Image stacking is a process of taking many short exposure time images, subtracting an average dark background image from each short exposure time image, and then stacking or adding up all the resultant short exposure images to create a long time exposure image. With each microbolometer thermal sensing focal plane array, several image frames can be stacked, e.g., nine frames (N=9) with the dark background subtracted from each frame, take the volume integral, and then further take the average (i.e., stack) of the nine volume integrals. The result is a further improvement of the signal-to-noise ratio by a factor of 3, or $N^{0.5}$, or the square root of the number of samples.

As will further be understood from the disclosure herein, a benefit of individual microbolometers array sensors elements making up a larger array (i.e., the composite thermal sensing focal plane array) in total offers the flexibility of individual control of gain, bias voltage, and frame rate per each microbolometer array sensor element. Since gain, bias voltage, and frame rate are global for each pixel in an individual microbolometer sensor array element, there would be no way to have a high gain or a low gain region on one microbolometer sensor array element.

With the embodiments of the present disclosure, individual control of gain, bias voltage, and frame rate can be set per each individual microbolometer sensor array element of the composite thermal sensing focal plane array. Gain must be controlled to maximize signal-to-noise for each target gas to be detected. Some anesthetic gases such as nitrous oxide (NO) has strong absorption at 16.949 μm and would require a low gain to measure the absorption signal, while other anesthetic gases such as halothane will require a high gain setting. Amplifier gain in each microbolometer sensor array element is set with the use of an integrator circuit that collects charge, e.g., the longer the integration time the higher the gain. Longer integration times may reduce the frame rate of the microbolometer sensor array element as opposed to low gain settings where higher frame rates can be achieved.

Unlike an approach in which a single microbolometer array element is used for detecting multiple different gas species in which there is only one gain setting, one bias voltage, and one frame rate possible, the embodiments of the present disclosure advantageously enable many gain settings, many bias voltage settings, and many frame rates to be implemented simultaneously. In the example of FIG. 3, there could be a potential of up to nine different gain values, up to nine different bias voltage settings, and up to nine different frame rates may be implemented. In other words, the embodiment of FIG. 3 can have a maximum of nine different bias voltages, and nine different frames rates to collect the data coming off the nine individual microbolometer sensor array elements.

Furthermore, with the use of individual microbolometer sensor array elements to create a larger array or mosaic of sensors (i.e., the composite thermal sensing focal plane array), not only can the gain, bias voltage, and frame rate be unique to each microbolometer sensor array element, but so can the microbolometer sensor material used for each sensor array element be unique as well. Typically, microbolometers used today have a sensor material used to form a temperature sensitive resistor, or thermistor, made from vanadium oxide (VOX) or amorphous silicon (a-Si), and other materials are being explored as well to improve sensitivity and thermal wavelength bandwidth. Each different material used for a given mocrobolometer sensor will have different responsiveness or response characteristics to different wavelengths of thermal energy when exposed to a black body thermal source.

With the use of different microbolometer sensor array elements according to the embodiments of the present disclosure, it would be possible to have a different microbolometer sensing material used for each of the specific microbolometer sensor array elements of the composite thermal sensing focal plane array. For instance, in the example of nine individual microbolometer sensor array elements, one of the nine elements could be a vanadium oxide based element, while another could be an amorphous silicon based element. In this manner, the different sensor material microbolometer sensor arrays elements are advantageously tailored to provide the best responsiveness or response characteristics to thermal energy at the targeted bandwidth of infrared energy that those individual sensor elements would require to detect a particular anesthetic gas.

Another way to illustrate this point would be say microbolometer sensor array element $28_1$ out of the nine sensor array elements of FIG. 3 is used to detect halotane at 12.500 μm or 800 cm−1. At this wavelength, since vanadium oxide has a better responsiveness than amorphous silicon, element $28_1$ is chosen to use vanadium oxide as the sensor material. On the other hand, say sensor array element $28_9$ out of the nine sensor array elements of FIG. 3 is used to detect enflurane at 7.326 μm or 1365 cm−1. Vanadium oxide has a poorer responsiveness at this wavelength, while the responsiveness of amorphous silicon is better. Therefore, sensor element $28_9$ is chosen to comprise an amorphous silicon based microbolometer sensor array element.

According to one embodiment, the one or more anesthetic and respiratory gas species comprise species selected from the group consisting of 1.) carbon dioxide, 2.) nitrous oxide, 3.) enflurane, 4.) halothane, 5.) isoflurane, 6.) desflurane, and 7.) sevoflurane. In another embodiment, center wavelengths and wavelength bandwidths for each of the IR filter elements $14_{1-N}$ are selected for uniquely identifying each of a plurality of different gas species in a gas mixture to be (i) supplied to, (ii) received from, or (iii) supplied to and received from a subject. In other words, by selecting appropriate center wavelengths and a narrow enough wavelength bandwidth for each band-pass filter coated on the filter mosaic, each of the above gas species, 1 through 7, can be identified in the gas mixture supplied to and from the anesthetized patient. Since gases 3 through 7, identified above, would almost never be used in a combination or mixture with one another, unique gas species identification becomes easy.

According to a further embodiment, a combination of different gas species, center wavelengths, and wavelength bandwidths, respectively, for the gas monitoring apparatus 10 of the present disclosure, comprise two or more selected from the group consisting of (i) carbon dioxide, 14.925 μm and 670 cm$^{-1}$, (ii) nitrous oxide, 16.949 μm and 590 cm$^{-1}$, (iii) enflurane, 7.326 μm and 1365 cm$^{-1}$, (iv) halothane, 12.500 μm and 800 cm$^{-1}$, (v) isoflurane, 8.25 μm and 1212 cm$^{-1}$, (vi) desflurane, 8.456 μm and 1182.5 cm$^{-1}$, and (vii) sevoflurane, 9.615 μm and 1040 cm$^{-1}$, as discussed further herein. Each gas can be identified and then, based on the absorption at those specific wavelengths, the gas concentration can be determined. The only gas mixtures presently used in anesthesia would be one gas from gas 3 through 7, listed above, in combination with nitrous oxide (NO) and oxygen ($O_2$). Since the gas concentration would typically be based on minimum alveolar concentration (MAC) values determined by clinical studies, the gas concentrations for desflurane are up to 6% (rarely up to 20%), halothane up to 0.75%, isoflurane up to 1.15%, enflurane up to 1.68%, and sevoflurane up to 1.85%.

Furthermore, with this type of technology, according to the present embodiments, in which anesthetic gas concentration are measured simultaneous at some frame rate and as sensitivity and the thermal time constant of microbolometer sensors improve from the current typical value of 8 msec, it will be possible to measure not only the gas concentration being supplied to a patient, but also the residual concentration of gas expired by the patient on a breath by breath basis, such as $CO_2$ monitoring in capnography. Advantageously, this would allow an anesthesiologist to understand what gases are going in and what gases are coming out to determine how much was really absorbed by the patient.

Figure 6:
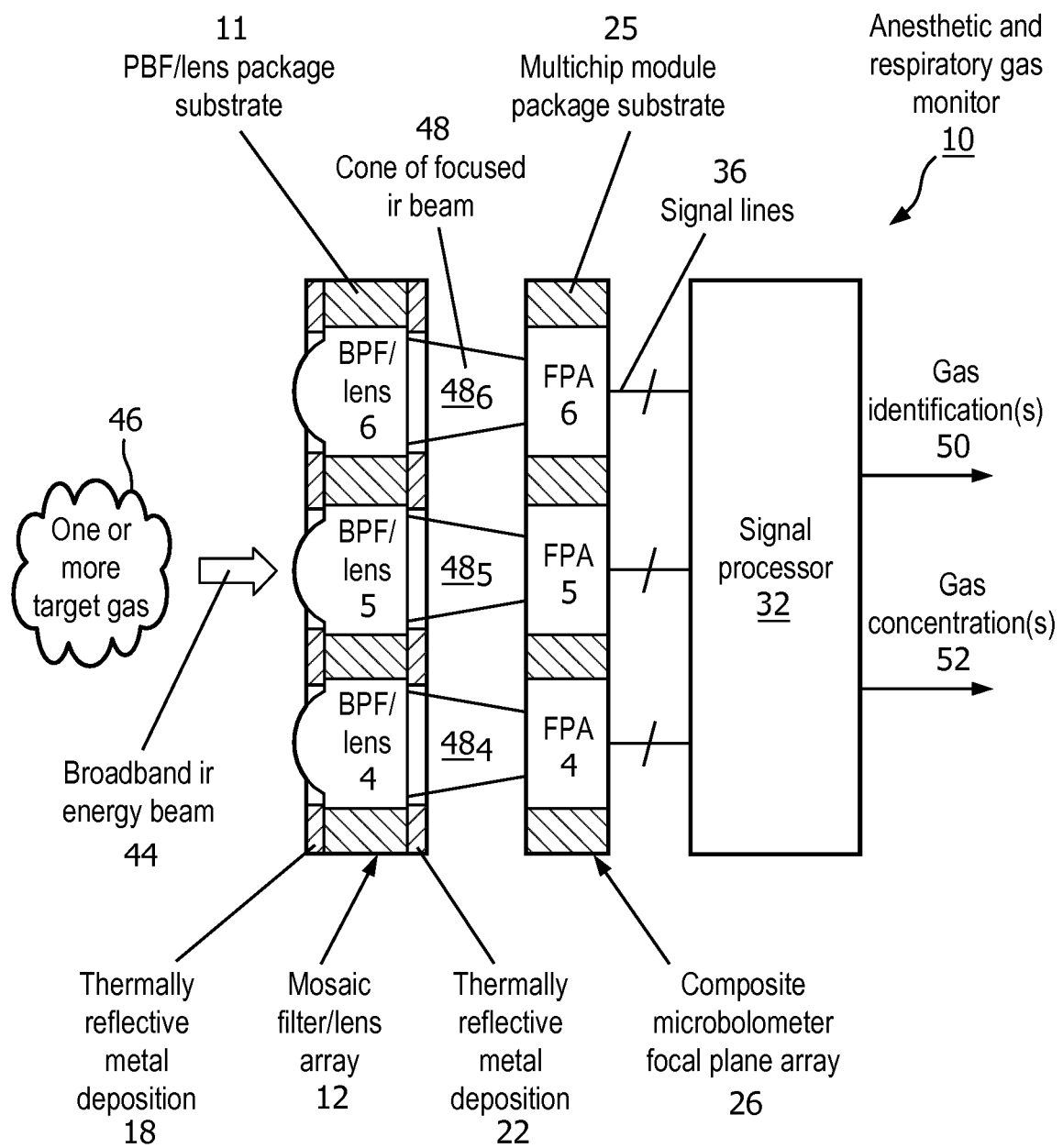
FIG. 6 is a schematic representation view of the gas monitoring apparatus, showing a cross-section of the multi-spectral mosaic filter and lens array and composite thermal sensing focal plane array, according to another embodiment of the present disclosure.

With reference now to FIG. 6, there is shown a schematic representation view of the gas monitoring apparatus 10, according to another embodiment, that includes a cross-section of the multi-spectral mosaic filter and lens array and composite thermal sensing focal plane array. The embodiment of FIG. 6 is similar to that of FIG. 5, with the following differences. The mosaic filter and lens array 12 includes (i) a patterned thermally reflective metal disposition layer 18 disposed on or overlying a first surface (e.g., corresponding to surface 20 in FIG. 1) at least between adjacent lens structures (e.g., corresponding to lens structures $14_4$, $14_5$, and $14_6$ in FIG. 1) and (ii) a patterned thermally reflective metal disposition layer 22 disposed on or overlying a second surface (e.g., corresponding to surface 24 in FIG. 2) at least between adjacent filter elements (e.g., corresponding to filter elements $16_4$, $16_5$, and $16_6$ in FIG. 2). As discussed herein, the patterned reflective metal depositions 18 and 22, alone or in combination, each advantageously forms a window frame or cross-talk minimization structure of windows, eliminating and/or significantly reducing an undesirable cross-talk between adjacent optical channels of the lens/filter structures and focal plane sensing arrays.

Figure 7:
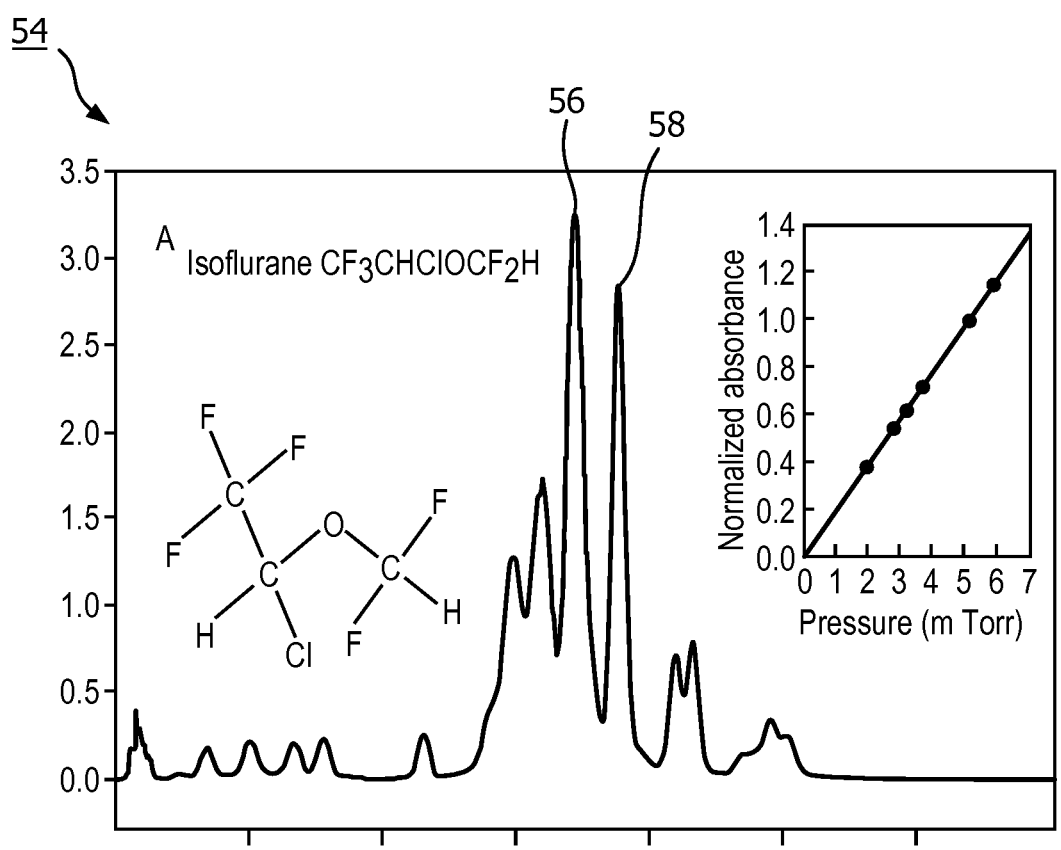
FIG. 7 is a graph view of absorption spectrum for a target gas having more than one absorption peak which can be used to calculate a total absorption value, wherein the gas monitoring apparatus includes a corresponding band-pass filter centered around each of a desired respective one or more absorption peak, according to an embodiment of the present disclosure.

Turning now to FIG. 7, a graph view is shown of an absorption spectrum 54 for a target gas having more than one absorption peak, e.g., peak 56 and 58, which can be used to calculate a total absorption value, wherein the gas monitoring apparatus includes a corresponding band-pass filter centered around each of a desired respective one or more absorption peak, according to an embodiment of the present disclosure. As can be understood from FIG. 7, another aspect of using different wavelengths of band-pass filters in the multi-spectral mosaic filter and lens array is the possibility to use more than one wavelength for each target gas. By using two or more wavelengths, an additive measurement can be made to improve the signal-to-noise ratio of the measurement as well. For instance, in FIG. 7, a target gas of isoflurane has its strongest absorption peaks at 1167.5 cm−1 (i.e., peak 56) and 1212 cm−1 (i.e., peak 58). By having one each of two band-pass filters of the multi-spectral mosaic filter and lens array centered about these two peaks, respectively, the thermal sensing measurements from the corresponding thermal sensing FPAs of the composite thermal sensing FPA can be used to calculate a total absorption value and thus improve the thermal measurement signal-to-noise ratio.

According to the embodiments of the present disclosure, a respiratory gas monitor for real-time simultaneous anesthetic gas concentration monitoring has been disclosed that utilizes a composite of two dimensional focal plane pixel array microbolometer sensors (or microbolometer cameras) with a multi-spectral mosaic filter/lens array and signal processing that includes the following features:

1.) Data oversampling due to hundreds of data channels provided by hundreds of thermal detectors per a specific gas infrared absorption wavelength band. Over-sampling statistically improves the dataset for the calculation of averages, means, modes, and standard deviations. This results in an improved signal resolution and extends the effective number of bits of resolution in an analog-to-digital converter data output.

2) Since a microbolometer camera captures data by the frame (i.e., entire number of pixels read out by rows and columns), frame-by-frame averaging can be done on a pixel-by-pixel basis. For instance, the pixel data value from a pixel at row 1, column 1 of frame 1 can be added to the pixel value of a pixel at row 1, column 1 of frame 2, and divided by two to get an average value. This can be done for M number of frames for each pixel coordinate divided by M to get a running average of the frame data on a per pixel basis.

3) Frame sub-array pixel sections consisting of an area can be averaged with the same area in subsequent frames, yielding a sub-array pixel area average.

4) Since a lens is used to create a circular spot area under a given band-pass filter in the filter mosaic array above the pixels in a respective microbolometer sensor array element, and the filter elements are separated by a reflective mask to create a window frame shadow onto the pixel array, it is possible to scan across the pixel array and determine the pixel boundaries of each filter element due to this shadow casting effect which are actually cooler pixels. From this, the boundaries between adjacent filter elements can be mapped. Within these boundary maps, the useful areas for each pixel sub-array under each filter element can be determined.

5) With no thermal source energy being provided, placing the microbolometer sensor array element in the dark, a pixel map can be created to determine pixels that are hot, i.e., too high in value to provide any useful dynamic range.

6) With thermal source energy applied, a pixel map can be created to determine which pixels are non-responsive, i.e., too low in value to be of any useful dynamic range.

7) By determining the hot and non-responsive pixels maps, the corresponding pixels can be excluded from any signal measurements.

8) With no absorbing gas in the spectral optical path, the differential baseline of the pixel array can be determined by applying thermal source energy and subtracting the dark pixel data and excluding the mapped bad pixels. This will provide an offset correction per each active useful pixel. Pixel-by-pixel or frame sub-pixel averaging can be used.

9) With the presence of an absorbing gas, a spot of decreasing thermal energy will appear on the gas associated pixel sub-array, the intensity of the spot will continue to decrease linearly as gas concentration increases. A volume integral of the spot area can be calculated by adding up the analog-to-digital converter (ADC) values for those pixel values associated with the area of the circular spot. Since the x-axis and y-axis units are a pixel unit area, the volume is simply the z-axis or ADC value, adding up all the individual ADC values in that specific area will result in the calculation of the volume integral. Using the total energy provided by a 3-D volume measurement results in lower noise and improved signal to noise than a 2-D average will provide. Subtracting this 3-D volume value over the same volume area for the dark frame will yield the value of the differential signal proportional to gas concentration, corrected for offset errors, and bad pixels.

10) Periodic calibration by turning the thermal source off and capturing the dark frame values and comparing to the previous stored dark value will provide an auto-zeroing of the baseline offset. By turning the thermal source on, and comparing the captured frame values to previously stored frames values for source on will help in compensating for changes in gain (i.e., span) and the difference if significant can be used as a gain multiplier factor to either increase or decrease gain.

Figure 8:
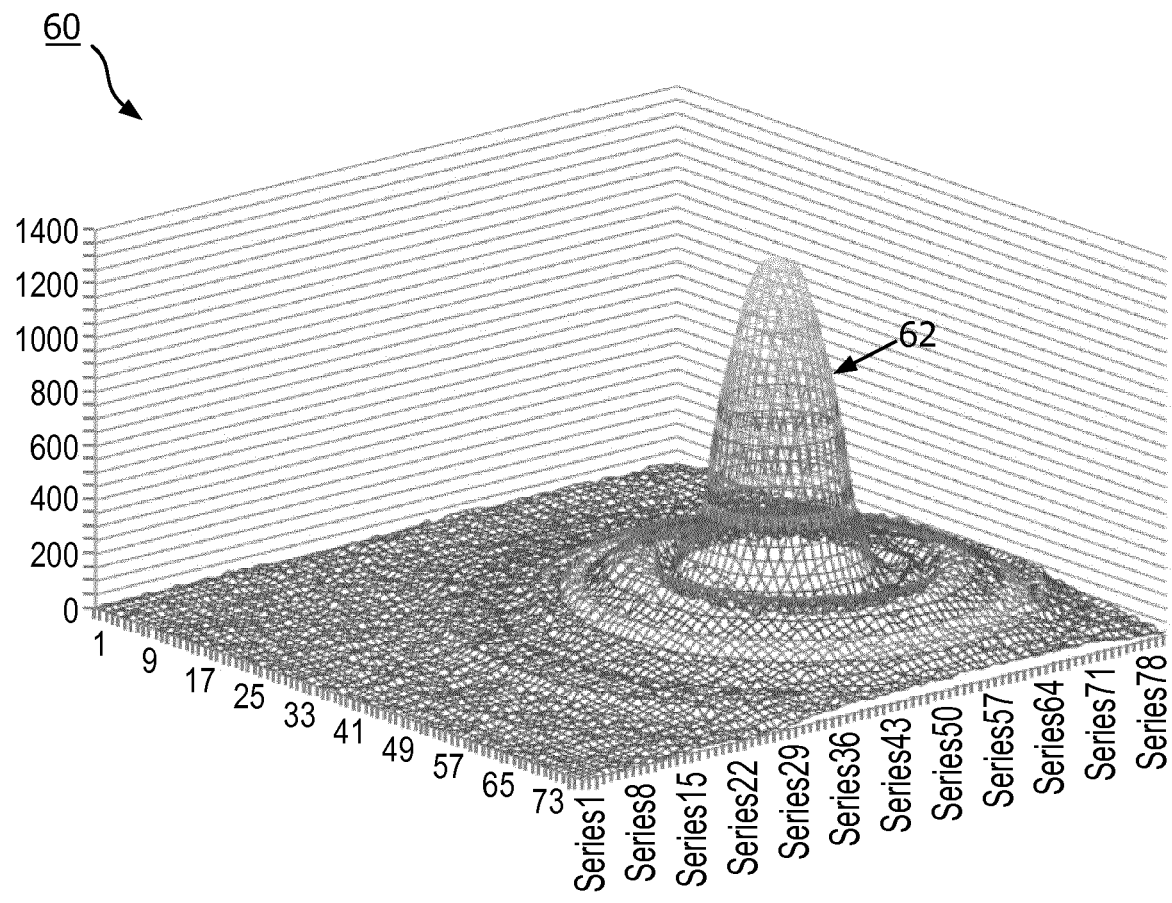
FIG. 8 is a graphical plot view of one example of sensed channel data of an individual thermal sensing focal plane array having a conical shape, collected and processed, according to an embodiment of the present disclosure.

With reference now to FIG. 8, a graphical plot 60 is shown of one example of sensed channel data of an individual thermal sensing focal plane array having a conical shape, collected and processed, according to an embodiment of the present disclosure. As discussed earlier herein with respect to the multi-spectral mosaic filter/focusing lens array, each filter/lens element will form, in response to exposure to an IR energy beam, a cone of focused infrared energy onto a pixel (or sub-pixel) array of a corresponding individual Microbolometer sensor array element. Under each filter/lens element of the mosaic filter/focusing lens array, the infrared beam focused onto a corresponding microbolometer sensor array element or pixel surface will have a corresponding pixel map generated by analog-to-digital converter(s) of the corresponding microbolometer sensor array element's read out integrated circuit (ROIC). The data from the corresponding microbolometer, when collected and processed, will have a conical shape, indicated by reference numeral 62, such as shown in FIG. 8.

Figure 9:
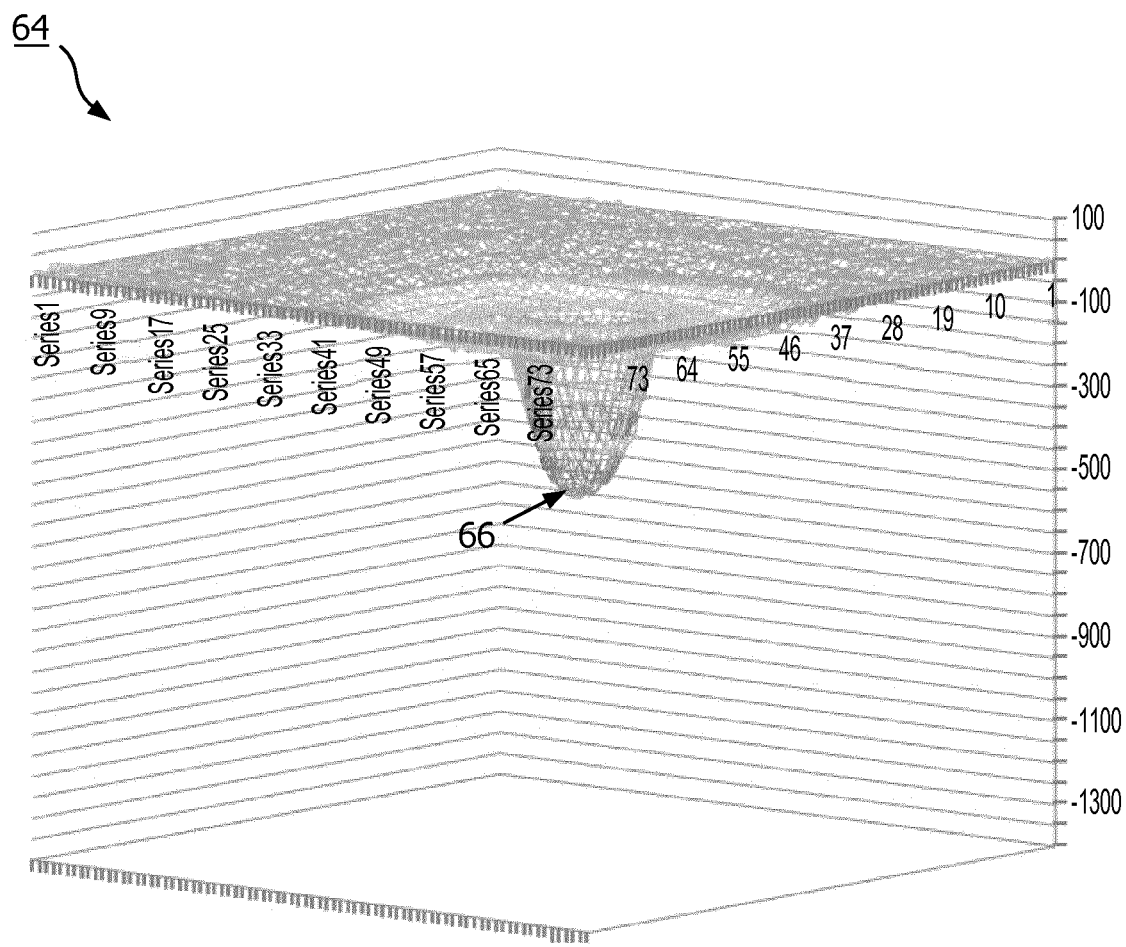
FIG. 9 is a graphical plot view of an example of sensed channel data of an individual thermal sensing focal plane array having a conical shape that represents a 5% concentration of the gas species, according to an embodiment of the present disclosure.
Figure 10:
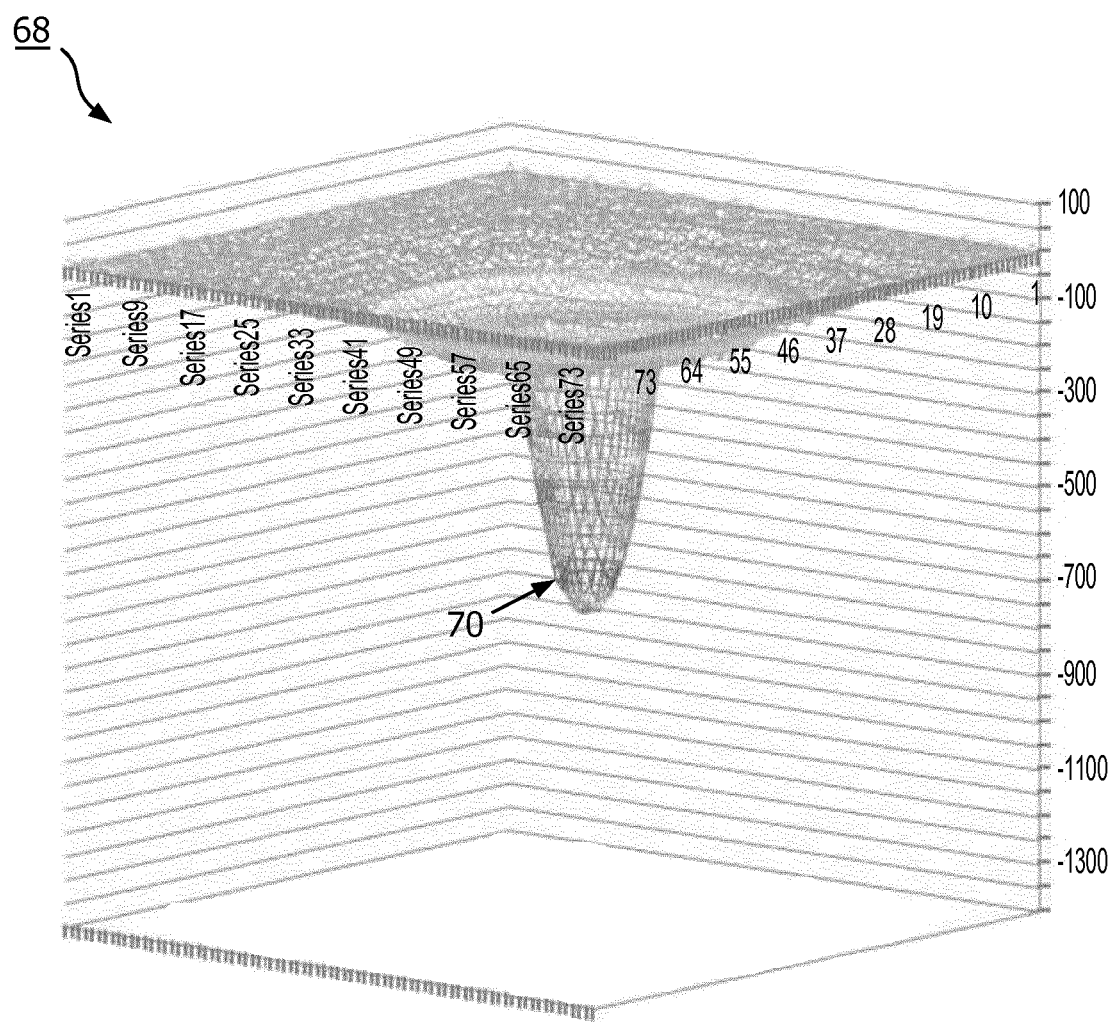
FIG. 10 is a graphical plot view of an example of sensed channel data of an individual thermal sensing focal plane array having a conical shape that represents a 10% concentration of the gas species, according to an embodiment of the present disclosure.

Turning now to FIG. 9, a graphical plot 64 is shown of an example of sensed channel data of an individual thermal sensing focal plane array having a conical shape 66 that represents a 5% concentration of the gas species, according to an embodiment of the present disclosure. In comparison, FIG. 10 is a graphical plot 68 of an example of sensed channel data of the individual thermal sensing focal plane array having a conical shape 70 that represents a 10% concentration of the gas species, according to an embodiment of the present disclosure. By detecting the start of a boundary of the absorption peak from the baseline or floor, the peak shape can be further refined for calculation of a volume integral or other signal-to-noise optimization algorithms.

Referring to FIG. 11, a representative view is illustrated of sensed channel data 72 of an individual thermal sensing focal plane array for a target gas species. The view shows a boundary 74 of an absorption peak, according to an embodiment of the present disclosure. Detection of the boundary can be accomplished using any suitable numerical data boundary detection or boundary fitting technique. The summation of all the values of sensed channel data within the boundary 74 of FIG. 11 represents the value of a corresponding volume integral. Advantageously, the summation of values within the boundary 74 provides a fast volume integral calculation with minimal computational effort.

The microbolometer analog-to-digital data values from FIG. 11 can also represented in a plot. For example, FIG. 12 is a graphical plot 76 of the sensed channel data of an individual thermal sensing focal plane array for a target gas species within the absorption peak boundary 74 of FIG. 11. The volume integral, as illustrated by conical shape 78 in FIG. 12, can thus be used to represent a concentration value of the target gas measurement. The greater the magnitude of the volume integral, the greater the concentration of the target gas. Since the gas minonitoring system is calibrated to known concentrations of calibration gas, the relationship of the volume integral to a known gas concentration can then be used to algebraically determined the concentration of an unknown concentration of the target gas.

According to another embodiment, with reference now to FIG. 13, a method 80 for monitoring an anesthetic and respiratory gas that is adapted to (i) identify a target anesthetic or respiratory gas species and (ii) determine a concentration of the identified target anesthetic or respiratory gas species comprises, at step 82, focusing and spectrally filtering received broadband infrared (IR) energy beam into a plurality of cones of focused and spectrally filtered IR beams, sensing, at step 84, each of the plurality of cones of focused and spectrally filtered IR beams, and generating, at step 86, an output signal, via a signal processor operatively coupled to receive the sensed channel data outputs of each respective integrated read out integrated circuit (ROIC) of a corresponding individual thermal sensing focal plane array, indicative of at least one of an identification and a concentration of a target gas selected from the group consisting of one or more anesthetic and respiratory gas species.

The focusing and spectrally filtering step 82 includes focusing and spectrally filtering, via a multi-spectral mosaic filter and lens array that comprises a two-dimensional array of lens structures and long wave infrared (IR) band-pass filter elements, the received broadband infrared (IR) energy beam into a plurality of cones of focused and spectrally filtered IR beams. The mosaic filter and lens array further includes at least one of (i) a patterned thermally reflective metal disposition layer disposed on or overlying a first surface at least between adjacent lens structures and (ii) a patterned thermally reflective metal disposition layer disposed on or overlying a second surface at least between adjacent filter elements.

The sensing step 84 includes sensing each of the plurality of cones of focused and spectrally filtered IR beams, via a composite thermal sensing focal plane array that comprises a plurality of individual thermal sensing focal plane arrays with integrated read out integrated circuits, wherein at least one individual thermal sensing focal plane array is provided for each respective one of the paired lens structure and filter elements of the mosaic filter and lens array. Each of the plurality of cones of focused and spectrally filtered IR beams is received by a respective individual thermal sensing focal plane array. The sensing step further includes outputting, via each respective integrated read out integrated circuit (ROIC) of a corresponding individual thermal sensing focal plane array, a respective sensed channel data responsive to receiving the respective focused and spectrally filtered IR beams.

The generating step 86 includes generating an output signal, via a signal processor operatively coupled to receive the sensed channel data outputs of each respective integrated read out integrated circuit (ROIC) of a corresponding individual thermal sensing focal plane array. The output signal is indicative of at least one of an identification and a concentration of a target gas selected from the group consisting of one or more anesthetic and respiratory gas species. The generating step is further based on an oversampling of an absorption signal on at least one or more of (i) a frame by frame basis and (ii) an image stacking basis of the sensed channel data outputs.

In another embodiment, the patterned thermally reflective metal layer comprises at least one of gold, platinum, titanium, palladium, nickel, aluminum, or any combination thereof. The patterned thermally reflective metal layer is configured to (i) create a window frame (or cross-talk minimization structure) of windows as apertures to minimize cross-talk between adjacent channels of a respective thermal sensing focal plane array of the composite thermal sensing focal plane array and paired lens structure and filter elements of the mosaic filter and lens array, and (ii) create respective thermal dark zones between the adjacent channels.

In a further embodiment, each IR filter element of the mosaic filter and lens array comprises a different narrow band-pass filter with a center wavelength ($\lambda_c$) unique to each of a corresponding one of at least a desired one or more target anesthetic or respiratory gas species to be monitored. In yet another embodiment, the method includes wherein two or more IR filter elements, each having a different center wavelength ($\lambda_c$), of the mosaic filter and lens array are used for an additive measurement in monitoring each of at least one or more target anesthetic or respiratory gas species.

Still further, in another embodiment, the method includes wherein each individual array of the composite thermal sensing focal plane array is configured with a gain, bias voltage, and frame rate that are unique to a respective individual thermal sensing focal plane array, wherein a sensor material of each of at least two individual thermal sensing focal plane arrays of the composite thermal sensing focal plane array is different from each other, and wherein the individual thermal sensing focal plane arrays with integrated read out integrated circuits comprise two-dimensional arrays selected from the group consisting of microbolometers, thermopiles, and pyroelectric, thermister, or biomaterial microcantilever thermal sensors. In yet another embodiment, the method includes wherein center wavelengths and wavelength bandwidths for the each of the IR filter elements are selected for uniquely identifying each of a plurality of different gas species in a gas mixture to be (i) supplied to, (ii) received from, or (iii) supplied to and received from a subject.

Although only a few exemplary embodiments have been described in detail above, those skilled in the art will readily appreciate that many modifications are possible in the exemplary embodiments without materially departing from the novel teachings and advantages of the embodiments of the present disclosure. For example, the embodiments of the present disclosure can be advantageously used in a hospital setting to measure and quantify the concentration of anesthetic and respiratory gas concentrations for human and non-human use. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. An anesthetic and respiratory gas monitoring apparatus adapted to (i) identify a target anesthetic or respiratory gas species and (ii) determine a concentration of the identified target anesthetic or respiratory gas species, the apparatus comprising:

a multi-spectral mosaic filter and lens array that comprises a two-dimensional array of paired lens structures and long wave infrared (IR) band-pass filter elements configured to receive a broadband infrared (IR) energy beam and to focus and spectrally filter the received broadband IR energy beam into a plurality of focused and spectrally filtered IR beams, the mosaic filter and lens array further having at least one of (i) a patterned thermally reflective metal layer (18) overlying a first surface at least between adjacent lens structures of the paired lens structures and long wave IR band-pass filter elements and (ii) a patterned thermally reflective metal layer overlying a second surface at least between adjacent filter elements of the paired lens structures and long wave IR band-pass filter elements;

a composite thermal sensing focal plane array that comprises a plurality of individual thermal sensing focal plane arrays with integrated read out integrated circuits, wherein an individual thermal sensing focal plane array is provided for and spaced a distance from a respective paired lens structure and filter element of the mosaic filter and lens array, and wherein each of the plurality of focused and spectrally filtered IR beams is directed onto a respective surface of an individual thermal sensing focal plane array and having a focused spot size less than a total surface area of the respective surface, with a remaining unexposed area of the respective surface outside the focused spot being thermally dark and used for dark baseline subtraction, wherein, responsive to receiving the focused and spectrally filtered IR beams, each respective integrated read out integrated circuit (ROIC) of a corresponding individual thermal sensing focal plane array outputs a respective sensed channel data; and a signal processor operatively coupled to receive the sensed channel data outputs (36) of each respective integrated read out integrated circuit (ROIC) of a corresponding individual thermal sensing focal plane array, wherein the signal processor is adapted to generate an output signal indicative of at least one of an identification and a concentration of a target gas selected from the group consisting of one or more anesthetic and respiratory gas species, based on an oversampling of an absorption signal on at least one or more of (i) a frame by frame basis and (ii) an image stacking basis of the sensed channel data outputs, with dark baseline subtraction.

2. The apparatus of claim 1, wherein each patterned thermally reflective metal layer comprises at least one of gold, platinum, titanium, palladium, nickel, aluminum, or any combination thereof, and is configured to (i) create a frame of windows as apertures to minimize cross-talk between adjacent channels, and (ii) create respective dark zones between the adjacent channels.

3. The apparatus of claim 2, wherein the multi-spectral mosaic filter and lens array comprises a lens/filter package substrate with a two dimensional array of paired lens structures integral with the long wave IR band-pass filter elements, wherein the composite thermal sensing focal plane array comprises a two-dimensional array of individual thermal sensing focal plane arrays with integrated read out integrated circuit formed within a multi-chip module packaging substrate, and wherein the dark zones between adjacent channels form dark pixels on a respective thermal sensing focal plane array of the composite thermal sensing focal plane array further for use in dark baseline subtraction.

4. The apparatus of claim 1, wherein the long wave IR band-pass filters are configured for passing long wave infrared wavelengths extending into mid-wave infrared wavelengths that comprise wavelengths from 2 µm to 15 µm.

5. The apparatus of claim 1, wherein each IR filter element of the mosaic filter and lens array comprises a different narrow band-pass filter with a center wavelength ($\lambda_c$) unique to a corresponding at least one or more target anesthetic or respiratory gas species to be monitored.

6. The apparatus of claim 1, wherein two or more IR filter elements, each having a different center wavelength ($\lambda_c$), of the mosaic filter and lens array are used for an additive measurement in monitoring each of at least one or more target anesthetic or respiratory gas species.

7. The apparatus of claim 1, wherein each individual array of the composite thermal sensing focal plane array is configured with a gain, bias voltage, and frame rate that are unique to a respective individual thermal sensing focal plane array.

8. The apparatus of claim 1, wherein a sensor material of each of at least two individual thermal sensing focal plane arrays of the composite thermal sensing focal plane array is different from each other.

9. The apparatus of claim 8, wherein the sensor material comprises one selected from the group consisting of vanadium oxide (VO) and amorphous silicon (a-Si).

10. The apparatus of claim 1, wherein the individual thermal sensing focal plane arrays with integrated read out integrated circuits comprise two-dimensional arrays selected from the group consisting of microbolometers, thermopiles, and pyroelectric, thermister, or biomaterial microcantilever thermal sensors.

11. The apparatus of claim 1, wherein the one or more anesthetic and respiratory gas species comprise species selected from the group consisting of carbon dioxide, nitrous oxide, enflurane, halothane, isoflurane, desfurane, and sevoflurane.

12. The apparatus of claim 1, wherein center wavelengths and wavelength bandwidths for each of the IR filter elements are selected for uniquely identifying each of a plurality of different gas species in a gas mixture to be (i) supplied to, (ii) received from, or (iii) supplied to and received from a subject.

13. The apparatus of claim 12, wherein a combination of different gas species, center wavelengths, and wavelength bandwidths, respectively, comprise two or more selected from the group consisting of (i) carbon dioxide, 14.925 µm and 670 $cm^{-1}$, (ii) nitrous oxide, 16.949 µm and 590 $cm^{-1}$, (iii) enflurane, 7.326 µm and 1365 $cm^{-1}$, (iv) halothane, 12.500 µm and 800 $cm^{-1}$, (v) isoflurane, 8.25 µm and 1212 $cm^{-1}$, (vi) desflurane, 8.456 µm and 1182.5 $cm^{-1}$, and (vii) sevoflurane, 9.615 µm and 1040 $cm^{-1}$.

14. The apparatus of claim 1, wherein generating the at least one of identification and concentration of the target gas based on the oversampling of the absorption signal on the at least one or more of (I) a frame by frame basis and (II) an image staking basis of the sensed channel data outputs for a respective thermal sensing focal plane array includes:

(i) creating a first pixel map, in an absence of any applied thermal source energy corresponding to a dark frame, of a pixel array of the respective thermal sensing focal plane array, and determining bad pixels that exhibit too high a value to provide any useful dynamic range, (ii) creating a second pixel map of the pixel array in a presence of an applied thermal source energy, and determining non-responsive pixels that exhibit too low a value to provide any useful dynamic range, (iii) determining, with no presence of absorbing gas in a spectral optical path of the respective thermal sensing focal plane array, a differential baseline of the pixel array by an applying thermal source energy and subtracting dark pixel data and excluding the determined bad pixels, wherein the differential baseline provides for an offset correction per each active useful pixel of the pixel array, (iv) calculating a volume integral, with a presence of absorbing gas in the spectral path, by adding up pixel values associated with a spot area of decreasing thermal energy appearing on the pixel array in response to the presence of the absorbing gas in the spectral path, and (v) subtracting a calculated volume integral of a same spot area for the dark frame from the calculated volume integral in the presence of the absorbing gas in the spectral path, to yield a value of a differential signal proportional to gas concentration, corrected for offset errors and bad pixels.

15. A method for monitoring an anesthetic and respiratory gas that is adapted to (i) identify a target anesthetic or respiratory gas species and (ii) determine a concentration of the identified target anesthetic or respiratory gas species, the method comprising:

focusing and spectrally filtering, via a multi-spectral mosaic filter and lens array that comprises a two-dimensional array of paired lens structures and long wave infrared (IR) band-pass filter elements, a received broadband infrared (IR) energy beam into a plurality of focused and spectrally filtered IR beams, wherein the mosaic filter and lens array further includes at least one of (i) a patterned thermally reflective metal layer overlying a first surface at least between adjacent lens structures of the paired lens structures and long wave IR band-pass filter elements and (ii) a patterned thermally reflective metal layer overlying a second surface at least between adjacent filter elements of the paired lens structures and long wave IR band-pass filter elements;

sensing each of the plurality of focused and spectrally filtered IR beams, via a composite thermal sensing focal plane array that comprises a plurality of individual thermal sensing focal plane arrays with integrated read out integrated circuits, wherein an individual thermal sensing focal plane array is provided for and spaced a distance from a respective paired lens structure and filter element of the mosaic filter and lens array, and wherein each of the plurality of focused and spectrally filtered IR beams is directed onto a respective surface of an individual thermal sensing focal plane array and having a focused spot size less than a total surface area of the respective surface, with a remaining unexposed area of the respective surface outside the focused spot being thermally dark and used for dark baseline subtraction, and outputting, via each respective integrated read out integrated circuit (ROIC) of a corresponding individual thermal sensing focal plane array, a respective sensed channel data responsive to receiving the respective focused and spectrally filtered IR beams; and generating an output signal, via a signal processor operatively coupled to receive the sensed channel data outputs of each respective integrated read out integrated circuit (ROIC) of a corresponding individual thermal sensing focal plane array, wherein the output signal is indicative of at least one of an identification and a concentration of a target gas selected from the group consisting of one or more anesthetic and respiratory gas species, based on an oversampling of an absorption signal on at least one or more of (i) a frame by frame basis and (ii) an image stacking basis of the sensed channel data outputs, with dark baseline subtraction.

16. The method of claim 15, wherein the patterned thermally reflective metal layer comprises at least one of gold, platinum, titanium, palladium, nickel, aluminum, or any combination thereof, and is configured to (i) create a frame of windows as apertures to minimize cross-talk between adjacent channels of a respective thermal sensing focal plane array of the composite thermal sensing focal plane array and paired lens structure and filter elements of the mosaic filter and lens array, and (ii) create respective thermal dark zones between the adjacent channels.

17. The method of claim 15, wherein each IR filter element of the mosaic filter and lens array comprises a different narrow band-pass filter with a center wavelength ($\lambda_c$) unique to a corresponding at least one or more target anesthetic or respiratory gas species to be monitored.

18. The method of claim 15, wherein two or more IR filter elements, each having a different center wavelength ($\lambda_c$), of the mosaic filter and lens array are used for an additive measurement in monitoring each of at least one or more target anesthetic or respiratory gas species.

19. The method of claim 15, wherein each individual array of the composite thermal sensing focal plane array is configured with a gain, bias voltage, and frame rate that are unique to a respective individual thermal sensing focal plane array, wherein a sensor material of each of at least two individual thermal sensing focal plane arrays of the composite thermal sensing focal plane array is different from each other, and wherein the individual thermal sensing focal plane arrays with integrated read out integrated circuits comprise two-dimensional arrays selected from the group consisting of microbolometers, thermopiles, and pyroelectric, thermister, or biomaterial microcantilever thermal sensors.

20. The method of claim 15, selecting center wavelengths and wavelength bandwidths for the each of the IR filter elements for uniquely identifying each of a plurality of different gas species in a gas mixture to be (i) supplied to, (ii) received from, or (iii) supplied to and received from a subject.

* * * * *